United States Patent
Laberteaux et al.

(10) Patent No.: US 8,230,215 B2
(45) Date of Patent: Jul. 24, 2012

(54) METHOD FOR ALLOCATING MULTIPLE AUTHENTICATION CERTIFICATES TO VEHICLES IN A VEHICLE-TO-VEHICLE COMMUNICATION NETWORK

(75) Inventors: Kenneth P. Laberteaux, Ann Arbor, MI (US); Yih-Chun Hu, Urbana, IL (US); Jason Haas, Urbana, IL (US)

(73) Assignees: Toyota Motor Engineering & Manufacturing North America, Inc., Erlanger, KY (US); The Board of Trustees, University of Illinois at Urbana-Champaign, Champaign, IL (US)

( * ) Notice: Subject to any disclaimer, the term of this patent is extended or adjusted under 35 U.S.C. 154(b) by 756 days.

(21) Appl. No.: 12/082,454

(22) Filed: Apr. 11, 2008

(65) Prior Publication Data
US 2009/0259841 A1  Oct. 15, 2009

(51) Int. Cl.
H04L 9/32 (2006.01)
H04K 1/00 (2006.01)
G06F 17/30 (2006.01)
G06F 13/00 (2006.01)
B60K 31/16 (2006.01)

(52) U.S. Cl. ........ 713/156; 713/179; 713/180; 713/181; 713/185; 380/28; 380/29; 380/30; 380/44; 726/18; 726/19; 180/173

(58) Field of Classification Search .................... 713/156
See application file for complete search history.

(56) References Cited

U.S. PATENT DOCUMENTS

| | | | | |
|---|---|---|---|---|
| 5,699,431 A * | 12/1997 | Van Oorschot et al. | ........ | 380/30 |
| 6,671,804 B1 * | 12/2003 | Kent | .............. | 713/175 |
| 6,775,771 B1 * | 8/2004 | Shrader et al. | ................ | 713/167 |
| 6,789,189 B2 * | 9/2004 | Wheeler et al. | ............... | 713/156 |
| 7,184,413 B2 | 2/2007 | Beyer et al. | | |
| 7,315,941 B2 * | 1/2008 | Ramzan et al. | ............... | 713/156 |
| 7,734,050 B2 * | 6/2010 | Tengler et al. | ................ | 380/270 |
| 7,742,603 B2 * | 6/2010 | Tengler et al. | ................ | 380/270 |
| 2003/0081583 A1 | 5/2003 | Kowalski | | |

OTHER PUBLICATIONS

Papapanagiotou, Konstantinos. Marias, Giannis F. Georgiadis, Panagiotis. A Certificate Validation Protocol for VANETs. 2007 IEEE Globecom Workshops. Pub. Date: Nov. 2007. Relevant pp. 1-9. Found on the World Wide Web at: http://ieeexplore.ieee.org/stamp/stamp.jsp?tp=&arnumber=4437825.*
Y-C Hu and K Laberteaux, Strong VANET Security on a Budget, Presented at ESCAR 2006 Workshop. 9 pages.

* cited by examiner

*Primary Examiner* — Nathan Flynn
*Assistant Examiner* — Jeremiah Avery
(74) *Attorney, Agent, or Firm* — Gifford, Krass, Sprinkle, Anderson & Citkowski, P.C.

(57) ABSTRACT

In a vehicle-to-vehicle communication network utilizing PKI security methods to protect communications and in which the PKI encryption utilizes a Certificate Authority having both a private key and a publicly distributed key, a method for allocating multiple certificates for each vehicle which are assigned to each vehicle in the communication network. The method includes the step of assigning a unique secret key k to each vehicle in the communication network. The Certificate Authority then creates a plurality of public key and private key encryption pairs for each vehicle and each encryption pair is associated with an index i. A plurality of certificates are then created with one certificate for each value of the index. A revocation list comprising the secret keys is maintained by the Certificate Authority so that all encryption pairs assigned to a particular vehicle may be revoked by the secret key k corresponding to that vehicle.

7 Claims, 1 Drawing Sheet

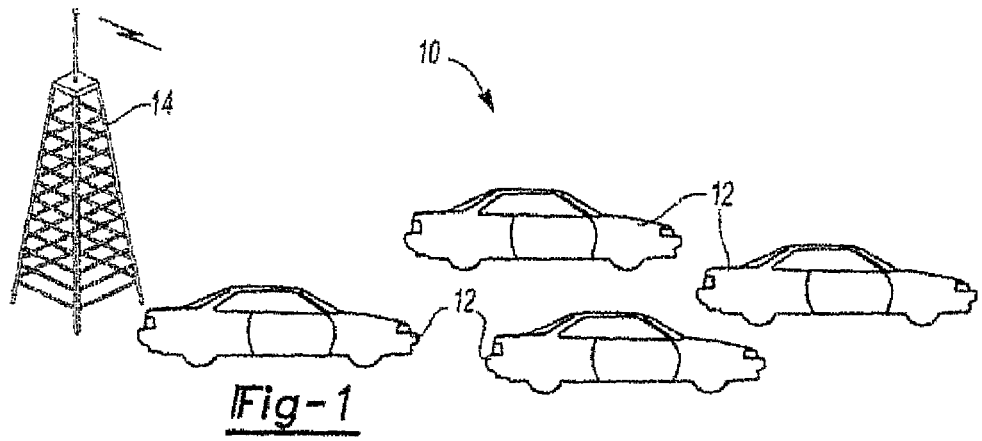
*Fig-1*
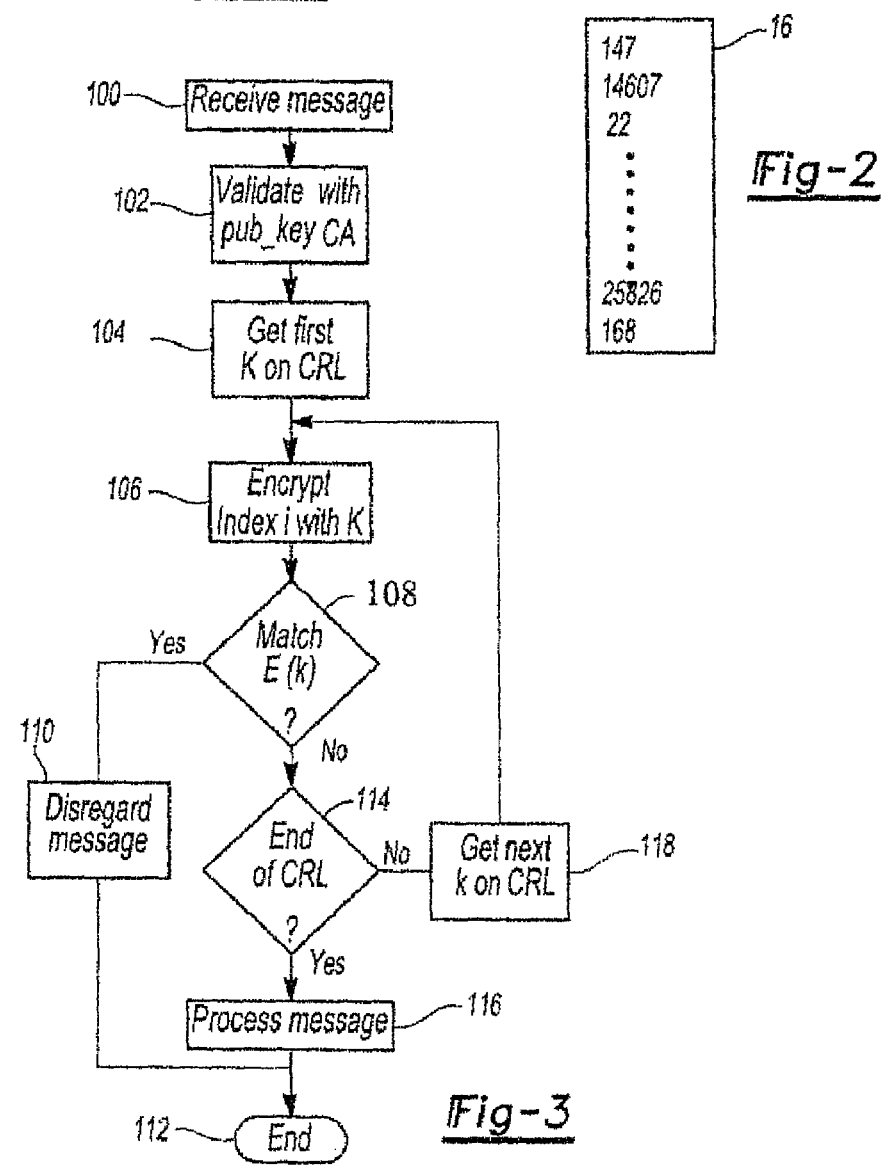
*Fig-2*
*Fig-3*

METHOD FOR ALLOCATING MULTIPLE AUTHENTICATION CERTIFICATES TO VEHICLES IN A VEHICLE-TO-VEHICLE COMMUNICATION NETWORK

BACKGROUND OF THE INVENTION

I. Field of the Invention

The present invention relates generally to vehicle-to-vehicle communication networks and, more particularly, to a method for allocating multiple authentication certificates for the vehicles within the network.

II. Description of Related Art

On an average day, many people are killed or injured and thousands of dollars incurred in property damage due to automotive accidents. This in turn results in a huge expenditure of healthcare dollars for treating those injured in such accidents, as well as lost labor from such injured or killed persons.

Many such accidents, however, may be prevented if the vehicle driver is warned of a hazardous driving condition in sufficient time so that the driver may react to avoid that hazardous condition. For example, a driver may cause a chain reaction accident by rapidly applying his or her brakes to avoid a collision with a deer or other animal. However, the drivers behind the vehicle about to strike the animal have insufficient time to avoid an accident thus resulting in a chain reaction accident. However, such an accident may be theoretically prevented or at least the injuries and damages minimized if the driver and/or vehicle potentially involved in the accident is able to react sufficiently rapidly to a hazardous driving condition in a fashion to minimize damage or injury or avoid such damage or injury altogether.

For that reason, dedicated short range communications (DSRC) have been proposed to permit communication between automotive vehicles as well as infrastructure for safety communications as well as other types of communications. At present, the federal government in the United States has allotted 75 megahertz in the wireless spectrum in the 5.9 gigahertz range for such communications. It is anticipated that more and more future vehicles will begin to include equipment for DSRC and, for that reason, a common protocol of the communications between different vehicles should be established in order to achieve maximum efficiency of the overall vehicle-to-vehicle communication system or network.

In managing the wireless communications between different vehicles, as well as infrastructure, the authenticity of the received message is paramount. Otherwise the vehicles may receive wireless communications from parties who intentionally transmit incorrect information. Another risk is a vehicle that, through malfunction, transmit incorrect information. Without authentication that the received messages are trustworthy, unsafe traffic conditions, traffic congestion and even traffic accidents may result.

In order to enable automotive vehicles to communicate between themselves and optionally infrastructure, it has been previously proposed to form a vehicle ad hoc network (VANET) with the automotive vehicles that are within the range of interest for a particular automotive vehicle. Such vehicles in the VANET would then communicate amongst themselves providing safety information as well as the status or status of operation of each vehicle in the network as well as nearby infrastructure. The number of vehicles in any particular VANET will, however, vary as different automotive vehicles enter or exit the VANET.

In order to ensure the authenticity or trustworthiness of the messages received within the vehicle network, it has been previously proposed to use public key infrastructure (PKI) encryption of the messages transmitted over the vehicle network. In such a PKI encryption, a Certificate Authority, such as a governmental body, distributes a public key for the Certificate Authority to all vehicles or nodes within the network. The Certificate Authority then also provides a signature encrypted with a private key of the Certificate Authority to each node and in which the signature is unique to that particular vehicle. For example, the PKI encrypted certificate for a particular vehicle may be bound to the vehicle identification number, license plate and/or the like.

It is also highly desirable that the Certificate Authority retain the power to revoke the authentication certificates previously granted to any vehicle or vehicles within the vehicle communication network. Such revocation would be highly desirable, for example, when a particular vehicle within the network begins to transmit messages or other information that is incorrect or otherwise untrustworthy. This may occur, for example, due to a malfunction of the DSRC equipment maintained by each vehicle.

While the assignment of a single authentication certificate by the Certificate Authority to the individual vehicle is sufficient to authenticate or encrypt messages subsequently transmitted by that vehicle, the use of a single certificate assigned by the Certificate Authority raises serious privacy concerns. For example, a vehicle within the network will repeatedly transmit the identity of that vehicle. Consequently, if a single certificate were utilized, it would be possible to monitor either the vehicle or various locations to determine if the vehicle has visited those locations. That, in turn, may result in a loss of privacy for the occupant of the particular vehicle.

In order to address these privacy concerns, it has been proposed that, instead of the Certificate Authority issuing a single certificate to each vehicle, the Certificate Authority instead issue multiple authentication certificates to each vehicle. Indeed, some have proposed that tens of thousands of certificates be issued to each vehicle.

Consequently, a vehicle that has been issued thousands of authentication certificates may periodically change the certificate utilized by the vehicle on a frequent basis, e.g. every ten minutes. By doing so, the issuance of thousands of authentication certificates to each vehicle should adequately address any privacy concerns that would otherwise result in tracking or monitoring that particular vehicle.

The issuance of multiple, indeed tens of thousands, of authentication certificates to each vehicle, however, creates additional difficulties in maintaining a certificate revocation list by the Certificate Authority. Such a certificate revocation list is disseminated to vehicles in the network to enable the vehicle to check if a received message originated from a vehicle having a revoked certificate and, if so, disregarding the received message.

More specifically, the Certificate Authority maintains the certificate revocation list for all vehicles for which the Certificate Authority has determined that the transmitted messages are not trustworthy. In the case where a single authentication certificate was assigned to a particular vehicle, it is only necessary to include a single entry in the certificate revocation list which is ultimately transmitted to other vehicles in the vehicle network. However, in a situation where each vehicle contains tens of thousands of authentication certificates, it would be necessary to list the tens of thousands of authentication certificates in the certificate revocation list whenever the trustworthiness of any particular vehicle is revoked.

The inclusion of tens of thousands of authentication certificates in the certificate revocation list for each vehicle in which the authentication trustworthiness has been revoked is unacceptable for several reasons. However, it is primarily unacceptable since such a bulky certificate revocation list not only requires unacceptably high processor overhead, but also consumes excessive bandwidth when transmitted to other vehicles. As such, this previously known proposal has not gained acceptance.

SUMMARY OF THE PRESENT INVENTION

The present invention provides a method for allocating multiple authentication certificates by the Certificate Authority to each vehicle in the communication network which overcomes the above-mentioned disadvantages of the previously known proposals.

In brief, the method of the present invention assigns a unique secret key k to each vehicle in the communication network. Only a single secret key k is assigned to each vehicle and the value for k assigned to each vehicle is different from all of the other values of k assigned to the other vehicles.

The Certificate Authority for the PKI encryption then creates a plurality of public key and private key encryption pairs for each vehicle. Each encryption pair, furthermore, has an associated index i. For example, if 25,000 public key and private key encryption pairs are provided to each vehicle, each encryption pair is assigned an index from 1 to 25,000.

The Certificate Authority then assigns a different certificate for each encryption pair so that each certificate is also assigned the index i. Each certificate, furthermore, is formed in accordance with the following equation:

$$Cert_i = \{E_k(i), i, pub\_key_i, sig_{CA}\}$$

where $Cert_i$ is the $i^{th}$ certificate for the vehicle k;

$E_k(i)$ is a vehicle identifier formed by encrypting the index i with the secret key k;

pub_key is the public key of the public key encryption pair of index i; and $sig_{CA}$ is the Certificate Authority's digital signature over the concatenation of $E_k(i)$, i, pub_key$_i$ using the Certificate Authority's private key.

In this fashion, the value $E_k(i)$ is the vehicle identifier of the certificate $Cert_i$. Thus, by using any good cipher, such as AES-128, the values of $E_k(i)$ for i in the range of 1 to 25,000 will appear to be completely random. In doing so, the privacy of the vehicle is ensured.

Whenever it is necessary for the Certificate Authority to evoke the authentication certificates for a particular vehicle, it is only necessary for the Certificate Authority to add the secret key k to the certificate revocation list. Thereafter, it is trivial for any verifier maintained by the vehicle to determine if the vehicle identifier $E_k(i)$ and the index i are related by the value k by simply encrypting the index i with the secret key value k on the certificate revocation list and seeing if the result equals the vehicle identifier $E_k(i)$. If so, any certificate that meets that criteria will be revoked and any received communication ignored by the receiving vehicle.

Consequently, unlike the previously known proposals, even though each vehicle has multiple and even tens of thousands of authentication certificates, the certificate revocation list increases by only one entry, namely the value of the secret key k which may be a relatively small number, e.g. 16 bytes, for each revoked vehicle.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is a diagrammatic view illustrating a vehicle ad hoc network;

FIG. 2 is an exemplary certificate revocation list; and

FIG. 3 is a flowchart illustrating the processing of received messages within the ad hoc network.

DETAILED DESCRIPTION OF A PREFERRED EMBODIMENT OF THE PRESENT INVENTION

With reference first to FIG. 1, a vehicle communication network on network 10 is diagrammatically illustrated as including a plurality of automotive vehicles 12, each of which forms a node in the network. The vehicles 12 together form a vehicle ad hoc network (VANET) which will change periodically in composition as new vehicles enter into the network while other vehicles leave the network.

The vehicles 12 communicate between themselves wirelessly using dedicated short range communications (DSRC). In the United States, the federal government has allotted a 75 megahertz band for wireless communications in the 5.9 gigahertz range for such communications.

For security as well as privacy, the wireless communications between the vehicles 12 in the communication network 10 are encrypted. Otherwise, corrupted messages or outright false messages may be transmitted between the vehicles 12 in the network 10.

In order to maintain the trustworthiness of the communications contained between the vehicles 12, public key infrastructure (PKI) encryption for the exchange of wireless communications is used. Under the PKI encryption method, a Certificate Authority 14 assigns at least one authentication certificate to each vehicle 12 within the network 10. Each authentication certificate is encrypted using the Certificate Authority's private key while the Certificate Authority's public key is openly disseminated to all of the vehicles 12 in the network 10. Consequently, upon receipt of a message by any of the vehicles 12 in the network 10, the receiving vehicle decodes the received message utilizing the Certificate Authority's public key.

In order to preserve the privacy of the vehicles 12 within the network 10, the Certificate Authority 14 allocates a plurality of authentication certificates to each vehicle 12. Preferably, the Certificate Authority 14 allocates tens of thousands of authentication certificates to each vehicle 12. These authentication certificates are sufficiently unique relative to each other so that it is essentially impossible to track a vehicle once it has changed its authentication certificate.

In assigning the authentication certificates to the various vehicles 12 in the network 10, the Certificate Authority first creates a number N of public and private key encryption pairs for each vehicle wherein each public and private encryption pair is associated with an index i. For example, if 25,000 public/private encryption key pairs (pub_key$_i$, pri_key$_i$) will be assigned where i varies from 1 to 25,000.

The Certificate Authority 14 also assigns a unique secret key k to each vehicle 12 in the network 10. Only one secret key k is assigned to each of the vehicles.

After the Certificate Authority 14 has assigned the multiple public key and private key encryption pairs for a particular vehicle 12 and assigned the secret key k for that vehicle, the Certificate Authority then creates an authentication certificate Cert$_i$ for each public key and private key encryption pair, or 25,000 such certificates for the example shown, in accordance with the following formula:

$$\text{Cert}_i = \{E_k(i), i, \text{pub\_key}_i, \text{sig}_{CA}\}$$

where
  $E_k(i)$=vehicle identifier formed by encrypting index i with secret key k;
  i=index;
  pub_key$_i$=public key of index i; and
  sig$_{CA}$=the Certificate Authority's digital signature over the concatenation of $E_k(i)$, i, pub_key$_i$ using the Certificate Authority private key.

The encryption of the index i by the secret key k may be performed with any convenient cipher, such as AES-128. Furthermore, the value $E_k(i)$ produced by that encryption will be unique to the vehicle and will appear to be random for different values of the index i. As such, the privacy of the vehicles 12 in the network 10 will be maintained since it will not be possible to track a vehicle 12 once it changes to the next index authentication certificate.

With reference now to FIG. 2 of the patent drawing, the Certificate Authority 14 also maintains a list 16 of vehicles 12 for which the authentication certificate has been revoked by the Certificate Authority. For example, the Certificate Authority may revoke the authentication certificate for a vehicle identified as transmitting untrustworthy messages to other vehicles 12 in the network 10.

Even though each vehicle 12 in the vehicle network 10 maintains multiple, perhaps tens of thousands, of authentication certificates, it is only necessary for the Certificate Authority 14 to add the secret key k to a certificate revocation list 16. For example, as shown in FIG. 2, assuming that one of the vehicles 12 was assigned the secret key 147 and that vehicle subsequently had its authentication certificate revoked, it is only necessary for the Certificate Authority 14 to enter a single number 147 in the certificate revocation list.

With reference now to FIG. 3, the processing of a received message is illustrated. At step 100, the vehicle 12 receives the message from another vehicle within the vehicle ad hoc network 10. Step 100 then proceeds to step 102.

At step 102, the vehicle 12 receiving the message validates the received message using the public key for the Certificate Authority. Step 102 then proceeds to step 104.

At step 104, the first secret key k on the certificate revocation list 16 (FIG. 2) is retrieved. Step 104 then proceeds to step 106 where the index i, obtained at step 102, is encrypted with the secret key k. Step 106 then proceeds to step 108.

At step 108, the method determines if the index i encrypted with k matches the vehicle identifier E(k). If so, the vehicle transmitting the message is on the certificate revocation list 16 and step 108 branches to step 110. The message is disregarded at step 110 and processing of the message then terminated at step 112.

Conversely, assuming that the encryption of the index i with the secret key k does not match the vehicle identifier E(k), step 108 instead branches to step 114. Step 114 determines whether or not the end of the certificate revocation list 16 has been reached. If so, step 114 branches to step 116 where the message is processed. Step 116 then proceeds to step 112 and terminates the procedure.

Conversely, if the end of the certificate revocation list 16 has not been reached at step 114, step 114 instead branches to step 118 where the method obtains the next secret key k on the certificate revocation list 16. Step 118 branches back to step 106 and the above process is repeated. In this fashion, the procedure iterates throughout the entire list of secret keys on the certificate revocation list 16 to determine if any matches are identified.

From the foregoing, it can be seen that, regardless of the number of authentication certificates assigned by the Certificate Authority 14 to each vehicle 12 in the network 10, the certificate revocation list 16 increases by only a single number k, e.g. 16 bytes, whenever a vehicle is added to the certificate revocation list 16. Furthermore, once the certificate revocation list 16 is obtained by the vehicles 12 from the Certificate Authority 14, preferably through wireless transmission from the Certificate Authority 14, it is trivial for the vehicle to correlate the secret keys on the certificate revocation list to the vehicle identifier E(k) upon receipt of a wireless message. This, in turn, reduces not only processor overhead, but also bandwidth requirements.

From the foregoing, it can be seen that the present invention provides a unique method for allocating authentication certificates from a Certificate Authority 14 and to individual vehicles 12 in a vehicle-to-vehicle network. The present invention, by the allocation of multiple private key and public key encryption pairs to each vehicle 12, not only maintains the integrity of the overall network, but also the privacy of the vehicles 12 within the network 10. Furthermore, by the use of the secret key, the certificate revocation list 16 maintained by the Certificate Authority 14 and ultimately transmitted in any of a number of different fashions to the various vehicles 12 in the network minimizes processing and bandwidth overhead.

Having described our invention, however, many modifications thereto will become apparent to those skilled in the art to which it pertains without deviation from the spirit of the invention as defined by the scope of the appended claims.

We claim:

1. In a vehicle-to-vehicle communication network utilizing public key infrastructure (PKI) security measures to protect communications between the vehicles and in which a Certificate Authority issues certificates to the vehicles, a method for the Certificate Authority to assign multiple certificates to each vehicle comprising the steps of:
  assigning a plurality of public key and private key pairs to each vehicle,
  assigning a unique index to each key pair,
  assigning a single unique secret key to each vehicle,
  assigning a unique certificate to each vehicle for each key pair, each certificate comprising a vehicle identifier formed by encrypting the index for said each certificate with said secret key, and
  then encrypting a concatenation of the vehicle identifier, the index and the public key with said private key,
  wherein all certificates for the vehicle are revocable by the Certificate Authority by revoking the secret key.

2. The method as defined in claim 1 and further comprising the step of creating a certificate revocation list by adding the secret key of the revoked vehicle to said certificate revocation list.

3. The method as defined in claim 2 wherein said Certificate Authority performs said creating step.

4. The invention as defined in claim 3 wherein said Certificate Authority maintains said certificate revocation list.

5. In a vehicle-to-vehicle communication network utilizing public key infrastructure (PKI) encryption to verify the trustworthiness of received communications, said PKI encryption utilizing a Certificate Authority having both a private_key$_{CA}$ and a publicly distributed public key public_key$_{CA}$, a method for allocating multiple authentication certificates for each vehicle in the communication network comprising the steps of:

assigning a unique secret key k to each vehicle in the communication network, creating a plurality of public key and private key encryption pairs for each vehicle with each encryption pair having an index i, forming a Certificate$_i$ for each value of the index i for each said pair, said Certificate$_i$ comprising the concatenation of:

$E_k(i)$ which is said index i encrypted by said secret key k, i which is said index, public_key$_i$ which is the public_key for said pair having index i, and sig$_{CA}$ which is the concatenation of $E_k(i)$, i and public_key$_i$ encrypted by the private_key$_{CA}$ of the Certificate Authority, wherein all certificates are revocable by the Certificate Authority revoking the secret key.

6. The method as defined in claim 5 and further comprising the steps of selectively revoking the public key and private key encryption pairs for selected vehicles by placing said secret key k for each said selected vehicle to a certificate revocation list and thereafter communicating said certificate revocation list to other vehicles in the communication network.

7. The method as defined in claim 6 wherein, upon receipt of a message by a vehicle in the network, the receiving vehicle iterates through the certificate revocation list and disregards the message if the message is identified as from a vehicle on the certificate revocation list.

* * * * *